US006643052B1

United States Patent
Goossen

(10) Patent No.: US 6,643,052 B1
(45) Date of Patent: Nov. 4, 2003

(54) APPARATUS COMPRISING A MICRO-MECHANICAL OPTICAL MODULATOR

(75) Inventor: Keith W. Goossen, Howell, NJ (US)

(73) Assignee: Aralight, Inc., Jamesburg, NJ (US)

( * ) Notice: Subject to any disclaimer, the term of this patent is extended or adjusted under 35 U.S.C. 154(b) by 0 days.

(21) Appl. No.: 09/788,714

(22) Filed: Feb. 20, 2001

(51) Int. Cl.$^7$ .............................................. G02B 26/00
(52) U.S. Cl. ...................... 359/290; 359/291; 359/248; 359/260
(58) Field of Search ................................ 359/290, 291, 359/248, 294, 295, 247, 263, 260, 292, 293

(56) References Cited

U.S. PATENT DOCUMENTS 5,589,974 A * 12/1996 Goossen et al. ............ 359/290
5,654,819 A * 8/1997 Goossen et al. ............ 359/291
5,857,048 A * 1/1999 Feuer et al. .................. 385/88

* cited by examiner

Primary Examiner—Huy Mai
Assistant Examiner—Tuyen Tra
(74) Attorney, Agent, or Firm—DeMont & Breyer, LLC

(57) ABSTRACT

A micro-mechanical optical modulator having a movable membrane that is spaced from a multi-layer mirror that is disposed on a substrate. The multi-layer mirror includes an anti-reflection layer that is disposed on the substrate, and a coating layer that is disposed on the anti-reflection layer. The combined thickness of the membrane and the coating layer is equal to an integer multiple of one-half of the operating wavelength of the modulator. This thickness restriction is different than prior art Fabry-Perot cavity modulators, which typically independently restrict membrane thickness and coating layer thickness, each to multiples of one quarter of the operating wavelength. By relaxing the requirements imposed by the prior art on layer thickness, modulator performance parameters can be optimized. Specifically, optical bandwidth can be traded for insertion loss and vice versa, as suits the specifics of a particular application.

20 Claims, 6 Drawing Sheets

340

344 — membrane, $n_s$, $t_m$

448 — air gap

556 — coating, $n_m$, $t_c = \lambda/2 - t_m + m\lambda/2$, m integer

554 — AR layer, $n_s^{1/2}$, $j\lambda/4$, j odd

} 342 substrate, $n_s$

FIG. 5
340 PRIOR ART

| | |
|---|---|
| 344 — | membrane, $n_s$, $t_m = m\lambda/4$, m odd |
| 448 — | gap |
| 556 — | coating, $n_s$, $t_c = i\lambda/4$, i odd |
| 554 — | AR layer, $n_s^{1/2}$, $j\lambda/4$, j odd |
| | substrate, $n_s$ |

{556 and 554 braced as} 342

FIG. 8
340

| | |
|---|---|
| 344 — | membrane, $n_s$, $t_m$ |
| 448 — | air gap |
| 556 — | coating, $n_m$, $t_c = \lambda/2 - t_m + m\lambda/2$, m integer |
| 554 — | AR layer, $n_s^{1/2}$, $j\lambda/4$, j odd |
| | substrate, $n_s$ |

{556 and 554 braced as} 342

APPARATUS COMPRISING A MICRO-MECHANICAL OPTICAL MODULATOR

FIELD OF THE INVENTION

The present invention pertains generally to optical communications, and more particularly to a micro-mechanical optical modulator.

BACKGROUND OF THE INVENTION

FIG. 1 depicts passive optical network 100. Network 100 includes central office or head-end terminal 102, splitter 110, wavelength routing device 112 and a plurality of network units $114_i$, i=1–n, interrelated as shown.

Central office 102 includes transmitter 104 and receiver 118. Transmitter 104 incorporates active optical source 106, such as a multi-frequency laser or light-emitting diode. Transmitter 104 generates optical signal 108, which is a wavelength division multiplexed ("WDM") signal. WDM signals comprise multiple independent data channels, each of which is assigned to a distinct optical wavelength. Central office 102 sends information over WDM optical signal 108 to the plurality of network units $114_1$–$114_n$, which each receive information over one of the distinct wavelengths.

Wavelength routing device 112 de-multiplexes WDM signal 108 into its constituent spectral components (optical wavelengths) $108_i$, i=1–n, such that the spectral components $108_i$ are spatially separated from one another. Each spatially-separated spectral component $108_i$ is then routed, over waveguides $113_i$, i=1–n, to the appropriate network unit $114_i$ as a function of wavelength. In some embodiments, the waveguides are optical fibers.

With reference to FIG. 2, waveguide $109_i$ delivers spectral component $108_i$ to splitter 220 in network unit $114_i$. Splitter 220 routes a first portion 222 of the power of spectral component $108_i$ to receiver 226, and a second portion 224 to transmitter 228.

Information is advantageously sent in packets to network unit $114_i$ via spectral component $108_i$. The packets contain information (ie., television programming, incoming e-mail, etc.) for processing as well as continuous wave ("CW") light or "optical chalkboard" which can be modulated with information. First portion 222 of spectral component $108_i$ is converted to an electrical signal that is representative, in part, of the information contained in the packet. The electrical signal is then routed to processing electronics, not shown. Optical modulator 230 in transmitter 228 modulates information on the CW light that is contained in second portion 224, generating modulated (ie., information-carrying) spectral component $116_i$. The information modulated onto the CW light can be, for example, phone message 232 or information 234 destined for the Internet.

Modulated spectral components $116_i$, i=1–n, returned from network units $114_1$–$114_n$, are multiplexed by wavelength routing device 112 into WDM signal 116. Splitter 110 routes signal 116 to receiver 118 in central office 102.

Optical modulator 230 that is used in network 100 can be a micro-mechanical optical modulator. This type of modulator typically uses optical interference principles to vary the signal strength of an optical signal (e.g., a carrier signal, such as the CW light of second portion 224 of spectral component $108_i$). One well-known implementation of such a modulator is depicted in FIG. 3.

Modulator 230 depicted in FIG. 3 incorporates a movable mirror, realized as movable layer or membrane 344 that is supported by supports 346 above fixed multi-layer mirror 342. The fixed multi-layer mirror is disposed on substrate 340. Membrane 344 forms a Fabry-Perot cavity, well known in the art, with underlying fixed mirror 342. Membrane 344 and fixed mirror 342 are electrically connected to controlled voltage source 350.

In operation, controlled voltage source 350 applies a voltage across membrane 344 and fixed mirror 342 thereby generating an electrostatic force. This force draws membrane 344 toward fixed mirror 342 along vector 452, as depicted in FIG. 4. When the applied voltage is withdrawn, membrane 344 returns to the quiescent or unactuated position depicted in FIG. 3.

As membrane 344 moves toward fixed mirror 342, the size of the Fabry-Perot cavity (i.e., the size of gap 448 between membrane 344 and fixed mirror 342) changes. This change is accompanied by a change in the reflectivity of modulator 230. The optical interference principle that governs this behavior is described with reference to FIG. 5.

In a typical prior art modulator, membrane 344 has an optical thickness that is an odd integer multiple of one-quarter of the operating wavelength ("$\lambda/4$") of the modulator. Fixed multi-layer mirror 342 consists of anti-reflection layer 554 and coating layer 556 that each have an optical thickness that is an odd integer multiple of $\lambda/4$. Membrane 344 and coating layer 556 have a refractive index that is equal to the refractive index of substrate 340. Anti-reflection layer 554 has a refractive index that is about equal to the square root of the refractive index of the substrate 340. See, Marxer et al., "MHz Opto-Mechanical Modulator," Transducers '95—Eurosensors IX, The $8^{th}$ International Conference on Solid-State Sensors and Actuators, and Eurosensors IX, Stockholm, Sweden, Jun. 25–29, 1995, pp. 289–292.

In a modulator that is configured as described above, modulator reflectivity is at a high value (i.e., a relative maxima) when the size of gap 448 is an odd integer multiple of $\lambda/4$. This configuration generates a constructive interference condition since the round trip distance of the optical signal from membrane 344, across gap 448, over coating layer 556 and back again is an integer multiple of $\lambda$. That is, the optical signal is in-phase.

Conversely, modulator reflectivity is reduced to zero (i.e., a relative minima) when the size of gap 448 is zero or an even integer multiple of $\lambda/4$. This configuration generates a destructive interference condition since the round trip distance of the optical signal is an integer multiple of $3\lambda/2$–180 degrees out of phase.

FIGS. 6 and 7 depict the performance of micro-mechanical modulator 230 having the layer arrangement and layer characteristics shown in FIG. 5 and that is designed for a wavelength, $\lambda$, of 1570 nanometers.

FIG. 6 depicts reflectivity as a function of wavelength for modulator 230 wherein membrane 344 is silicon and a substrate 340 is silicon. Plot 658 shows the maximum reflectivity condition wherein the size of gap 448 is an odd integer multiple of $\lambda/4$—in this case, $3\lambda/4$. For this particular configuration, maximum reflectivity is shown to be about 97 percent. Plot 660 shows the minimum reflectivity condition wherein the size of gap 448 is an even integer multiple of $\lambda/4$—in this case, $2\lambda/4$. For this particular configuration, minimum reflectivity is zero at the design wavelength of 1570 nanometers.

FIG. 7 depicts reflectivity as a function of wavelength for modulator 230 wherein membrane 344 is silicon and substrate 340 is germanium. Plot 762 shows the maximum reflectivity condition wherein the size of gap 448 is an odd integer multiple of λ/4, which, again, is 3λ/4. For this configuration, maximum reflectivity is, as before, about 97 percent. Plot 764 shows the minimum reflectivity condition wherein the size of gap 448 is an even integer multiple of λ/4, here, 2λ/4. Minimum reflectivity is zero at the design wavelength of 1570 nanometers.

FIGS. 6 and 7 demonstrate that silicon and germanium can be used interchangeably as the substrate with substantially no impact on modulator performance. FIGS. 6 and 7 also illustrate a shortcoming of this particular modulator arrangement. Specifically, while insertion loss is minimized for the modulator configuration described above, the operating bandwidth is relatively narrow. That is, minimum reflectivity rises relatively rapidly with deviations from the design wavelength (e.g., 1570 nanometers) so that contrast (ie., the ratio of the maximum reflectivity to the minimum reflectivity) rapidly decreases. Consequently, the art would benefit from an improved modulator design possessing a greater operating bandwidth, or at least the ability to trade insertion loss for bandwidth, as desired.

SUMMARY OF THE INVENTION

A micro-mechanical Fabry-Perot cavity optical modulator in accordance with the present invention provides the ability to trade insertion loss for bandwidth.

Optical modulators described in this specification include a substrate having a multi-layer mirror disposed thereon. The multi-layer mirror comprises an anti-reflection layer that is disposed on the substrate, and a coating layer that is disposed on the anti-reflection layer. The optical modulator also has a membrane that is separated by a gap from the coating layer. The membrane is movable, and, as it moves, the size of the gap changes. The reflectivity of the modulator is dependent upon the size of the gap. Specifically, modulator reflectivity is at a maximum when the size of the gap is an odd integer multiple of one-quarter of the operating wavelength of the modulator and at a minimum when the size of the gap is zero or even integer multiples of one-quarter of the operating wavelength.

In accordance with the illustrative embodiment of the present invention, the membrane and the coating layer have the same refractive index. Furthermore, the anti-reflection layer has a refractive index that is equal to the square root of the refractive index of the substrate. Additionally, the combined thickness of the membrane and the coating layer is equal to an integer multiple of one-half of the operating wavelength of the modulator. This thickness restriction is different than prior art Fabry-Perot cavity modulators, which typically independently restrict membrane thickness and coating layer thickness, each to multiples of one quarter of the operating wavelength.

By relaxing the requirements imposed by the prior art on layer thickness, modulator performance parameters can be optimized. Specifically, optical bandwidth can be traded for insertion loss and vice versa, as suits the specifics of a particular application.

BRIEF DESCRIPTION OF THE DRAWINGS

FIG. 5 depicts the layer structure of a prior art Fabry-Perot cavity optical modulator.

FIG. 8 depicts the layer structure of a Fabry-Perot cavity optical modulator in accordance with the illustrative embodiment of the present invention.

DETAILED DESCRIPTION

Figure 1:
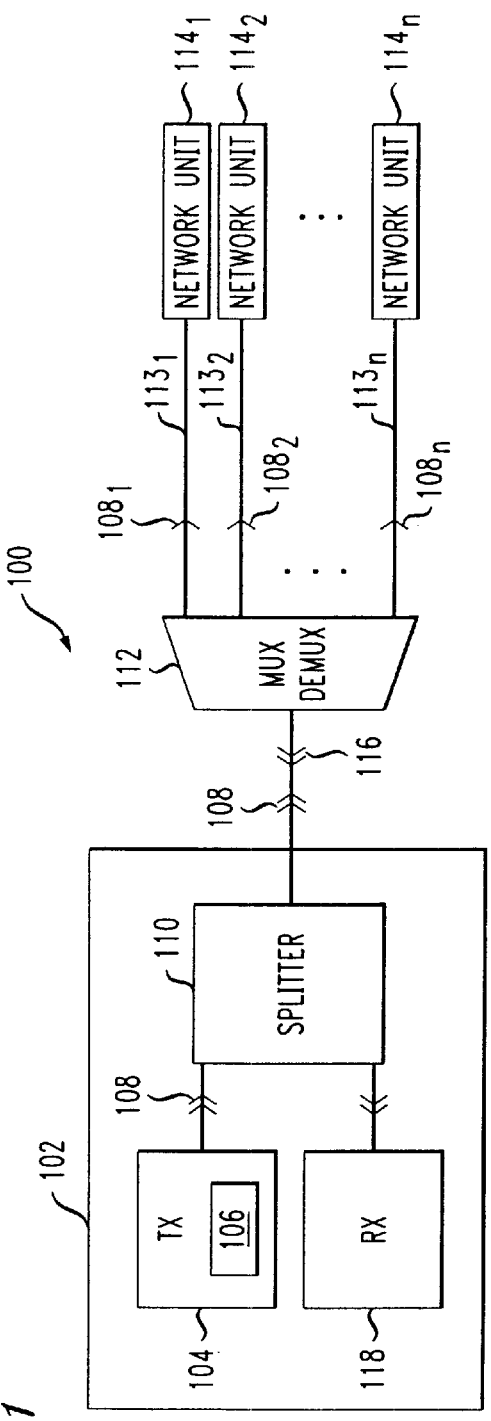
FIG. 1 depicts a schematic of a typical optical communications network.
Figure 2:
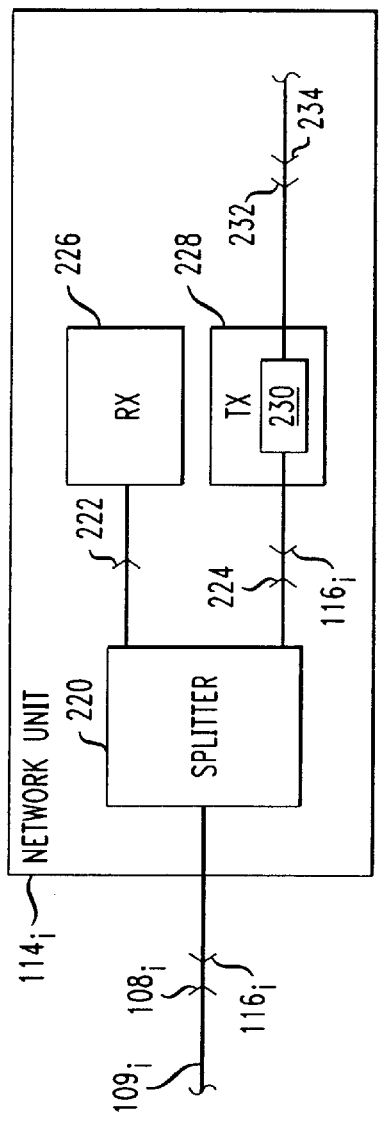
FIG. 2 depicts a network unit of the optical communications network of FIG. 1.

The terms listed below are given the following specific definitions for the purposes of this specification:

Operating wavelength, center wavelength and λ means the design wavelength of the modulator. Modulators operate over a range of wavelengths, centered about the operating or center wavelength. For example, a modulator having an operating or center wavelength of 1570 nanometers might exhibit acceptable performance (see the definition of bandwidth provided below) over a range from about 1545 nanometers to 1595 nanometers.

Contrast means the ratio of maximum reflectivity to minimum reflectivity.

Bandwidth means the range of wavelengths over which at least a 10:1 contrast (i. e., 10 dB of contrast) is obtained.

Optical thickness means the thickness of a layer of material, presented as a fraction of the operating wavelength, (e.g., λ/4, etc.) as measured in the material. Optical thickness is given by the formula:

$$\text{O.T.} = (\text{actual thickness of layer/operating wavelength}) \times \text{refractive index of the layer} \quad [1]$$

For example, given an operating wavelength of 1570 nanometers, and a silicon membrane with a refractive index of 3.48, a membrane having an optical thickness of λ/4 has an actual thickness of (1570/4)/3.48=1128 nanometers.

Quarter-wave layer means a layer having an optical thickness of one-quarter of the operating wavelength (i.e., λ/4).

Micro-mechanical optical modulators in accordance with the illustrative embodiment of the present invention possess the layer structure depicted in FIG. 8. The specific arrangement of layers—a membrane 344 separated by gap 448 from multi-layer mirror 342 that is disposed on substrate 340—is the same as the prior art arrangement that is depicted in FIG. 5. But while the arrangement of layers is the same as in the prior art, some of the properties and/or physical characteristics of those layers are different for the modulators described herein.

In particular, in accordance with the illustrative embodiment of the present invention, membrane 344 and coating layer 556 are not each restricted to an optical thickness of λ/4, as in the prior art (see FIG. 5). In fact, there is no restriction on the thickness of either of these layers, individually. The only restriction as to the thickness of membrane 344 and coating layer 556 is that the combined thickness of those two layers is equal to an even integer multiple of λ/2. And as long as that proviso is satisfied, then a zero reflectivity condition is achieved when the size of gap 448 is zero or an integer multiple of λ/2.

Furthermore, in the prior art, the refractive index of membrane 344, coating layer 556 and substrate 340 is the same. But in some optical modulators in accordance with the illustrative embodiment of the present invention, membrane 344 and coating layer 556 have a different refractive index than substrate 340. In some other optical modulators in accordance with the illustrative embodiment of the present invention, membrane 344, coating 556 and substrate 340 all have the same refractive index.

The layers of a modulator in accordance with the illustrative embodiment of the present invention have the properties specified in FIG. 8 and reproduced below:

membrane 344—has refractive index $n_m$ and thickness $t_m$.

gap 448—a relative maxima in reflectivity occurs at odd integer multiples of $\lambda/4$, a relative minima in reflectivity occurs at even integer multiples of $\lambda/4$.

coating layer 556—has refractive index $n_c$ and thickness $t_c$, wherein:

$$t_m + t_c \cong j\lambda/2 \text{ where j is an integer;} \quad [2]$$

$$n_c \cong n_m. \quad [3]$$

anti-reflection layer 554—has thickness $t_{ar}$ that is about equal to an odd integer multiple of $\lambda/4$ and refractive index $n_{ar}$, wherein:

$$n_{ar} \cong n_s^{1/2} \quad [4]$$

substrate 340—has refractive index $n_s$.

Figure 3:
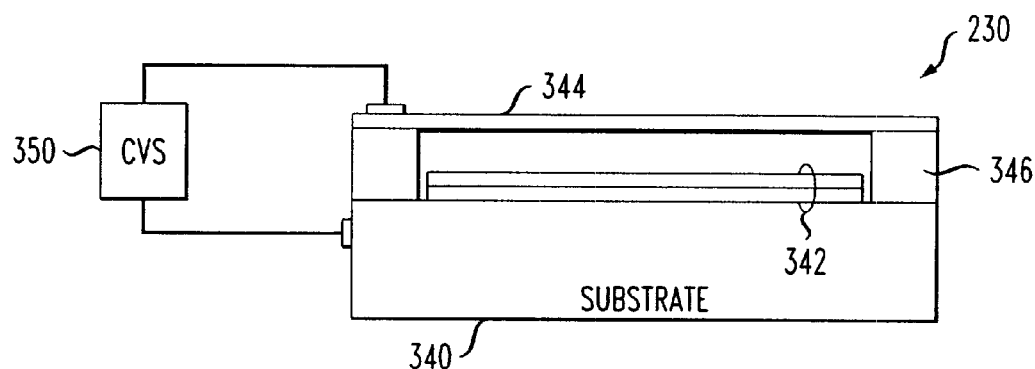
FIG. 3 depicts a schematic of a typical micro-mechanical optical modulator.
Figure 4:
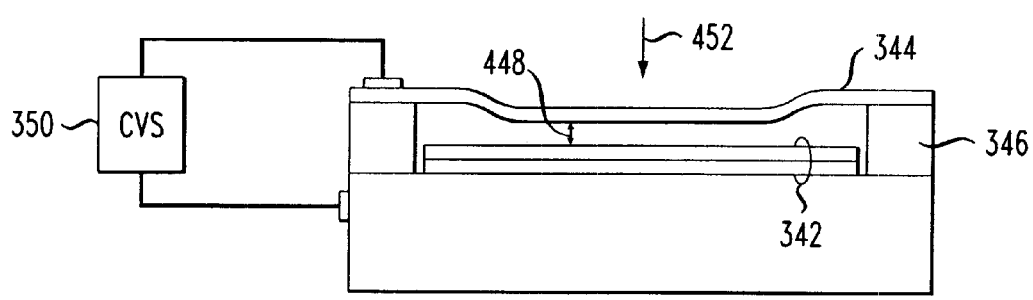
FIG. 4 depicts the modulator of FIG. 3 under bias.
Figure 6:
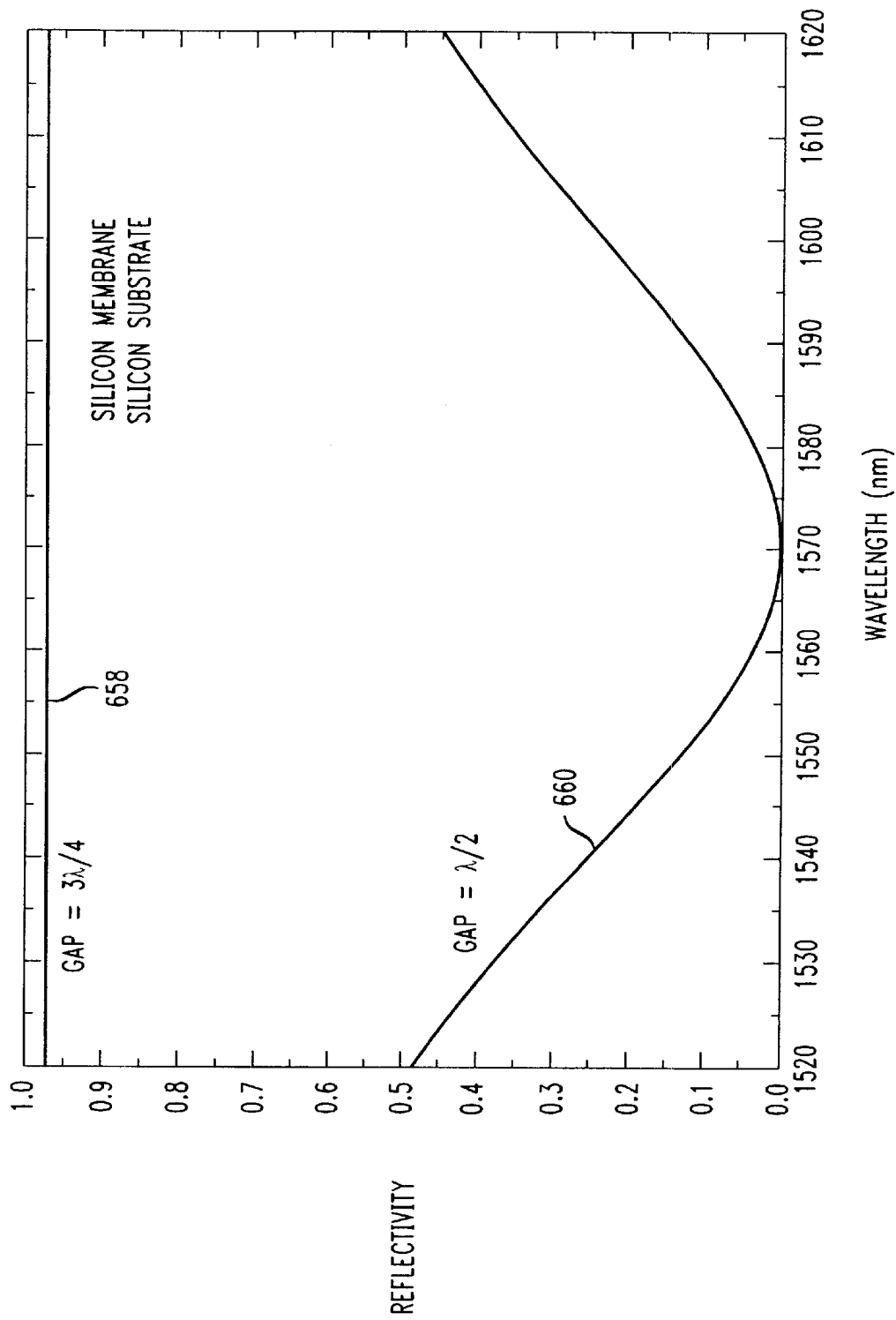
FIGS. 6 & 7 depict performance plots showing reflectivity versus wavelength for the Fabry-Perot cavity optical modulator of FIGS. 3–5.
Figure 7:
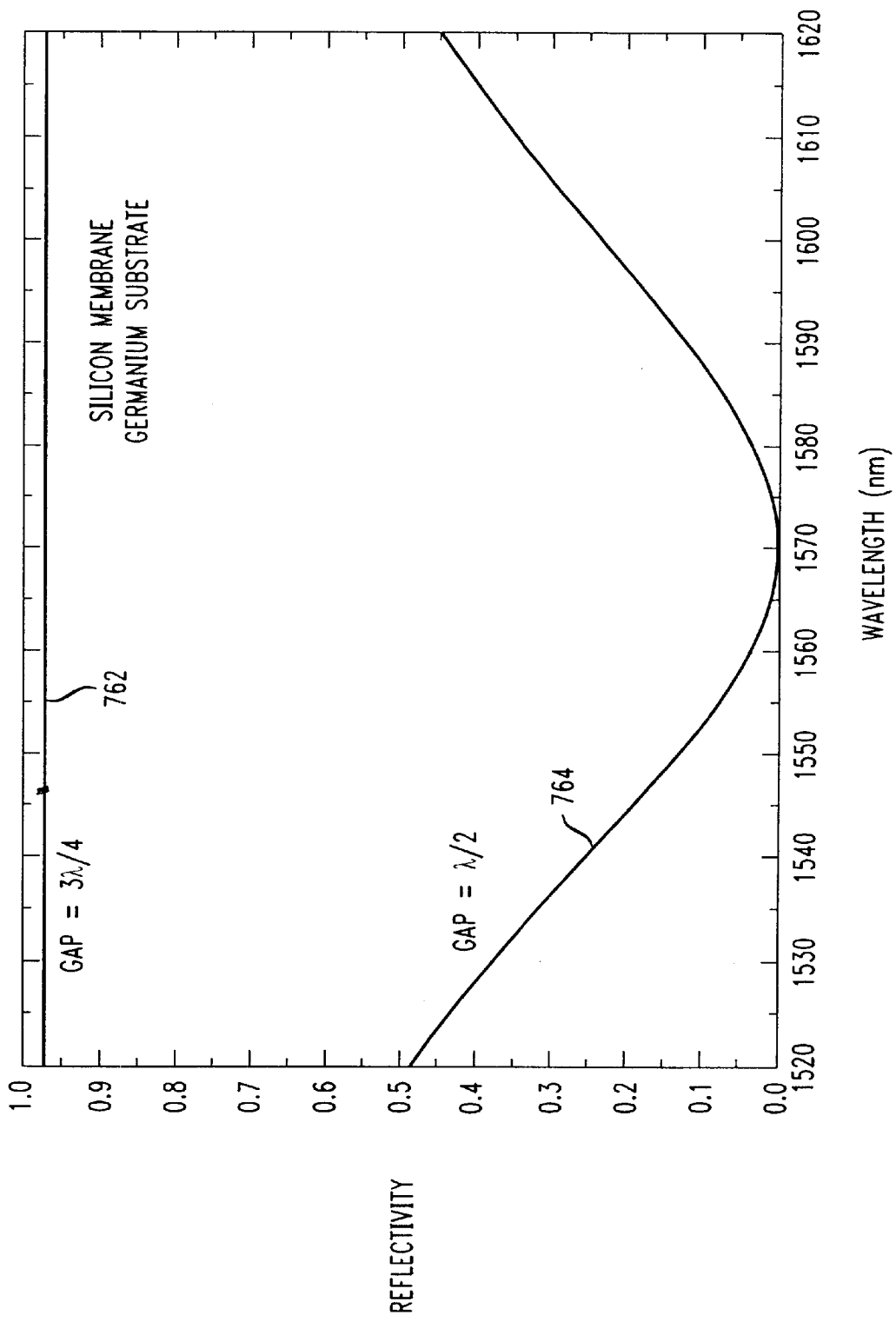

An optical modulator in accordance with the illustrative embodiment of the present invention has the arrangement of layers depicted in FIG. 8 and the structural configuration of modulator 230 depicted in FIG. 3. Specifically, membrane 344 is supported over multi-layer mirror 342 via supports 346, thereby defining gap 448 therebetween. Typically, membrane 344 has either a circular or rectangular shape. In operation, membrane 344 and substrate 340 are electrically connected to controlled voltage source 450. As a voltage is applied across membrane 344 and multi-layer mirror 342, an electrostatic force is generated. The electrostatic force draws membrane 344 downwardly toward multi-layer mirror 342.

Alternatively, the arrangement of layers depicted in FIG. 8 can be incorporated into any of a variety of structural configurations for modulation, as are well known in the art. See, for example, U.S. Pat. No. 5,751,469. The arrangement of layers depicted in FIG. 8 can be fashioned into a modulator using conventional micro-machining techniques, as are well known in the art.

Figure 9:
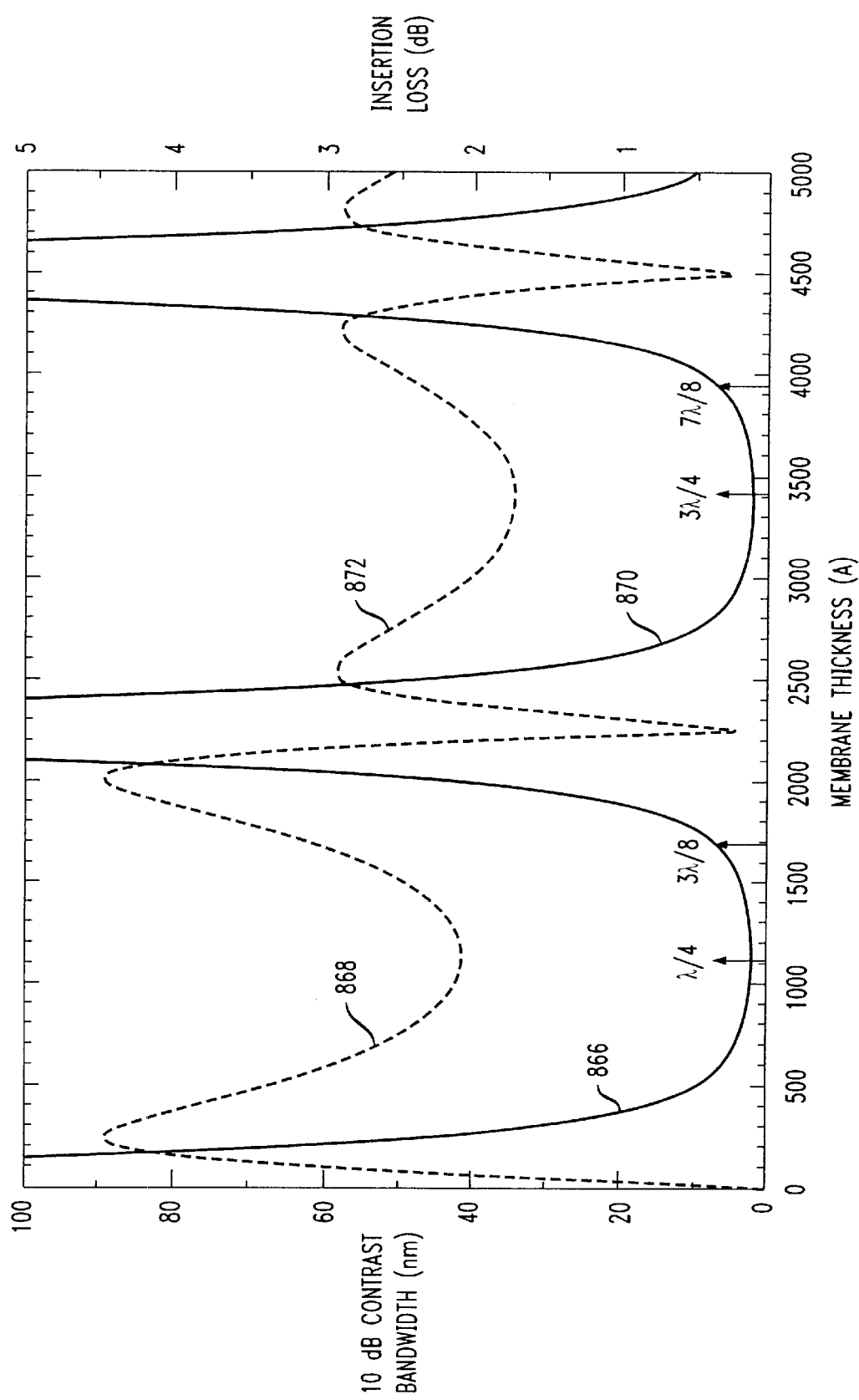
FIG. 9 depicts plots showing bandwidth and insertion loss as a function of membrane thickness.

FIG. 9 depicts plots that show bandwidth and insertion loss as a function of membrane thickness for a silicon membrane and a silicon substrate at an operating wavelength of 1570 nanometers. In particular, plots 866 and 870 depict insertion loss as a function of the thickness of membrane 344 (coating 556 having a thickness that is in accordance with expression [2]. Plots 868 and 872 depict bandwidth as a function of the thickness of membrane 344.

Plot 872 shows that for a standard prior art design with a membrane having an optical thickness of 3 $\lambda/4$, bandwidth is about 35 nanometers. Plot 870 indicates that for this design, insertion loss is 0.12 dB. By allowing membrane thickness to increase, as described herein, to 7 $\lambda/8$ for example (with coating 566 having a thickness $\lambda/8$), bandwidth increases to about 48 nanometers and insertion loss increases to 0.37 dB.

This increase in insertion loss of 0.25 dB (0.37–0.12) is comparable to the losses that occur in a fiber optic communications system due to the presence of various connectors and may therefore be considered to be negligible. But the increase in bandwidth of 13 nanometers advantageously allows 32 more channels in a typical wavelength division multiplexed (WDM) system wherein a channel is allocated for each 0.4 nanometers of wavelength. This small increase in bandwidth greatly increases the capacity of the WDM system and, hence, the commercial value of the communications system.

It is to be understood that the above-described embodiments are merely illustrative of the invention and that many variations may be devised by those skilled in the art without departing from the scope of the invention and from the principles disclosed herein. It is therefore intended that such variations be included within the scope of the following claims and their equivalents.

I claim:

1. An apparatus comprising a micro-mechanical modulator for modulating an optical signal having a wavelength $\lambda$, said micro-mechanical modulator comprising:

a substrate having refractive index $n_s$;

a multi-layer mirror disposed on said substrate;

a membrane that is separated from said multi-layer mirror by a gap and that is movable toward said multi-layer mirror, said membrane having a refractive index $n_m$ and a thickness $t_m$, wherein $n_m$ is not equal to $n_s$;

wherein said multi-layer mirror comprises:

an anti-reflection layer that is disposed on said substrate, said anti-reflection layer having a refractive index that is about equal to the square root of said substrate refractive index n, and a thickness that is about equal to an odd integer multiple of one-quarter of said wavelength $\lambda$; and a coating layer that is disposed on said anti-reflection layer, said coating layer having a refractive index $n_c$ and a thickness $t_c$, wherein a sum of said membrane thickness $t_m$ and said coating layer thickness $t_c$ is about equal to an integer multiple of one-half of said wavelength $\lambda$.

2. The apparatus of claim 1 wherein, in a first position of said membrane, said gap has a size that is about equal to an odd integer multiple of one-quarter of said wavelength $\lambda$.

3. The apparatus of claim 2 wherein, in a second position of said membrane, said gap has a size that is about equal to zero or an integer multiple of one-half of said wavelength $\lambda$.

4. The apparatus of claim 1 wherein said membrane thickness $t_m$ is not equal to an odd integer multiple of one-quarter of said wavelength $\lambda$.

5. The apparatus of claim 1 wherein said membrane comprises silicon and said substrate comprises germanium.

6. The apparatus of claim 5 wherein said coating layer comprises silicon nitride.

7. The apparatus of claim 1 wherein said membrane thickness $t_m$ is less than one-half of said wavelength $\lambda$.

8. The apparatus of claim 1 having a bandwidth of at least 45 nanometers.

9. The apparatus of claim 1 further comprising a controlled voltage source that is electrically connected to said membrane and said substrate.

10. The apparatus of claim 1 further comprising a waveguide for delivering said optical signal to said membrane.

11. The apparatus of claim 10 further comprising:

a transmitter that transmits said optical signal to said waveguide; and a receiver that receives a modulated optical signal from said micro-mechanical modulator.

12. An apparatus comprising a micro-mechanical modulator for modulating an optical signal having a wavelength $\lambda$, said micro-mechanical modulator comprising:

a substrate having refractive index $n_s$;

a multi-layer mirror disposed on said substrate; and a membrane that is spaced from and movable towards said multi-layer mirror, said membrane having a refractive index $n_m$ that is about equal to said refractive index $n_s$, and a thickness $t_m$;

wherein said multi-layer mirror comprises:

an anti-reflection layer that is disposed on said substrate; and a coating layer that is disposed on said anti-reflection layer, said coating layer having a thickness $t_c$; and further wherein:

a sum of said membrane thickness $t_m$ and said coating layer thickness $t_c$ is about equal to an integer multiple of one-half of said wavelength $\lambda$; and said membrane thickness $t_m$ is not equal to an odd integer multiple of one-quarter of said wavelength $\lambda$.

13. The apparatus of claim 12 wherein said membrane comprises silicon and said substrate comprises silicon.

14. The apparatus of claim 13 wherein said coating layer comprises silicon nitride.

15. The apparatus of claim 12 wherein said membrane thickness $t_m$ is less than one-half of said wavelength $\lambda$.

16. The apparatus of claim 12 having a bandwidth of at least 45 nanometers.

17. The apparatus of claim 12 further comprising a controlled voltage source that is electrically connected to said membrane and said substrate.

18. The apparatus of claim 12 further comprising a waveguide for delivering said optical signal to said membrane.

19. The apparatus of claim 18 further comprising:

a transmitter that transmits said optical signal to said optical waveguide; and a receiver that receives a modulated optical signal from said micro-mechanical modulator.

20. An apparatus comprising an optical modulator for modulating an optical signal having a wavelength $\lambda$, said optical modulator comprising:

a non-moving multi-layer mirror comprising a coating layer disposed on an anti-reflection layer, said coating layer having a thickness $t_c$; and a membrane that is spaced from and movable towards said non-moving multi-layer mirror, said membrane having a thickness $t_m$; wherein:

a sum of said membrane thickness $t_m$ and said coating layer thickness $t_c$ is about equal to an integer multiple of one-half of said wavelength $\lambda$; and further wherein:

said membrane thickness $t_m$ is not equal to an odd integer multiple of one-quarter of said wavelength $\lambda$.

* * * * *